W. M. PEEL.
CULTIVATOR FENDER.
APPLICATION FILED NOV. 16, 1917.

1,279,418.

Patented Sept. 17, 1918.
2 SHEETS—SHEET 1.

Witness
F. C. Gibson.
L. Wilcox.

Inventor
William M. Peel.

By Victor J. Evans
Attorney

W. M. PEEL.
CULTIVATOR FENDER.
APPLICATION FILED NOV. 16, 1917.
1,279,418.
Patented Sept. 17, 1918.
2 SHEETS—SHEET 2.
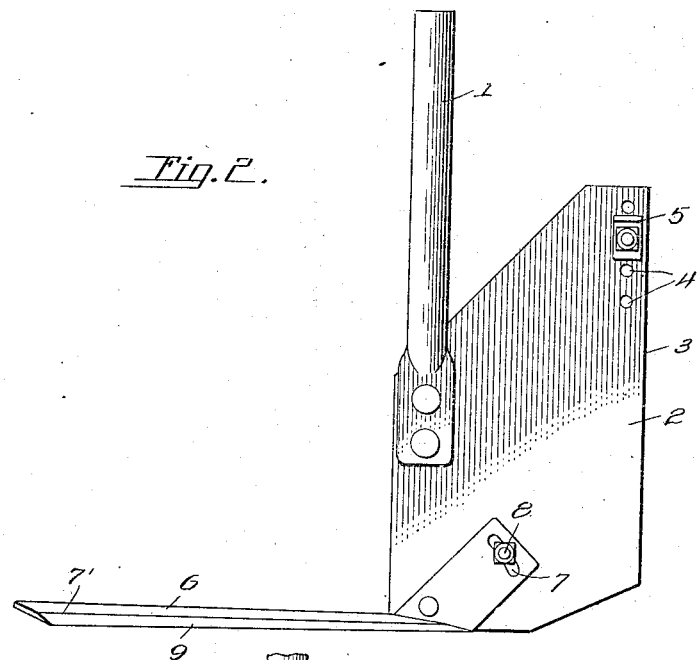
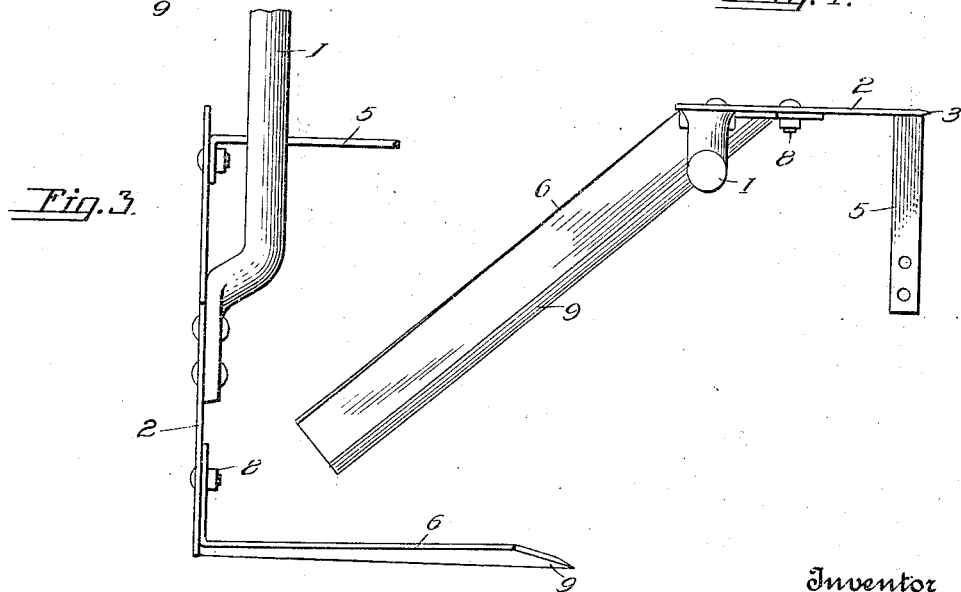
Witness
F. C. Gibson.
I. Wilcox.
Inventor
William M. Peel.
By Victor J. Evans
Attorney

UNITED STATES PATENT OFFICE.

WILLIAM M. PEEL, OF ASPERMONT, TEXAS.

CULTIVATOR-FENDER.

1,279,418.   Specification of Letters Patent.   Patented Sept. 17, 1918.

Application filed November 16, 1917. Serial No. 202,367.

*To all whom it may concern:*

Be it known that I, WILLIAM M. PEEL, a citizen of the United States, residing at Aspermont, in the county of Stonewall and State of Texas, have invented new and useful Improvements in Cultivator-Fenders, of which the following is a specification.

This invention relates to cultivator fenders and has for its object to provide an implement of the kind, which in pairs, right and left, are adapted to loosen the earth about plants in rows, and to remove weeds more closely along young plants, without danger of more or less burying or covering of the same with soil.

A further object of the invention is to provide a fender of the character stated, the parts of which are susceptible of numerous adjustments whereby they may be accommodated to the conditions of the soil or the plants.

In the accompanying drawings:—

Fig. 2 is a side elevation of the fender.

Fig. 3 is an edge elevation of the same.

Fig. 4 is a top plan view of the same.

Figure 1:
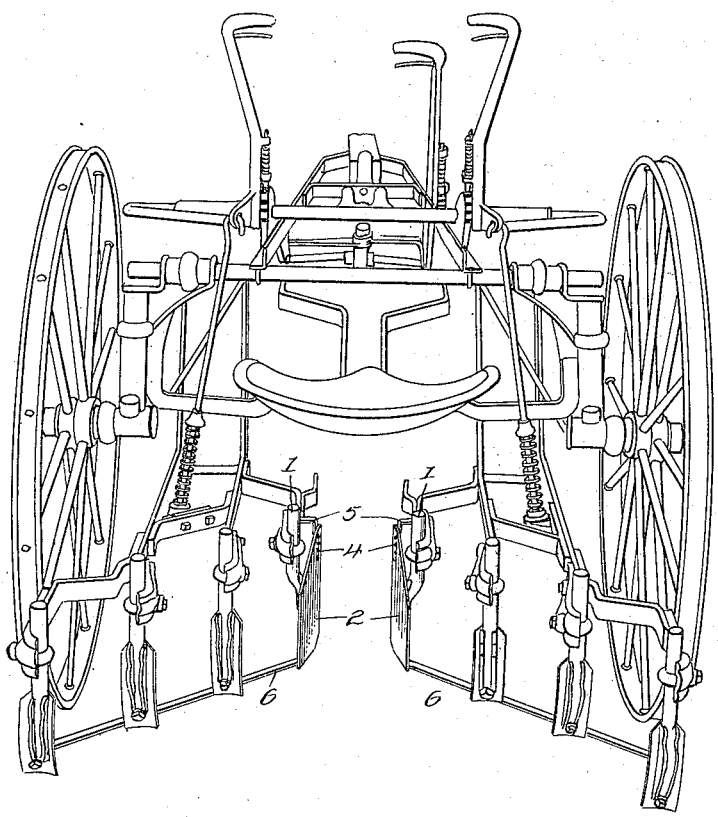
Figure 1 is a rear view of the cultivator equipped with the fender.

The fender comprises a standard 1 which is adapted to be secured to the beam of the cultivator by means of clamps or any other suitable securing devices and in a usual manner. The opposite ends of the standards 1 are offset with relation to each other. A plate 2 is secured to the lower end of the standard 1 and the said plate in side elevation is in the form of a trapezoid. Two of the parallel edges of the plates 2 are vertically disposed and the forward edge 3 thereof is sharpened. The plate 2 is provided at its upper forward corner with a series of vertically arranged perforations 4, any one of which may receive a bolt whereby a brace 5 may be adjustably connected with the said plate 2. The said brace in turn is adapted to be secured to the beam of the cultivator by means of bolts, clamps or other suitable securing devices.

A blade 6 is pivotally connected with the lower rear portion of the plate 2 and that end part of the blade 6 which lies against the plate 2 is provided with an elongated opening 7 which receives a bolt 8. The bolt 8 passes through a perforation in the plate 2 and by loosening the said bolt 8 the blade 6 may be swung on its pivotal connection with the plate 2 whereby the blade 6 may be disposed at a desired angle or pitch with relation to the plate and a horizontal line. When the blade has been properly adjusted it is secured in fixed position with relation to the plate 2 by tightening the bolt 8. The blade 6 is provided with an outwardly and rearwardly extending portion 7' the forward edge of which is sharpened as at 9. The portion 7' of the blade 6 is twisted slightly in order that the rear portion of the said blade may be disposed at a more decided angle with relation to a horizontal line than the forward portion thereof.

As illustrated in Fig. 1 of the drawing the cultivator beams which are arranged to move at the opposite sides of a row of plants are each equipped with a fender and the blades of the fenders are disposed outwardly substantially in opposite directions. The plates 2 are in vertical position at the opposite sides of the row of plants and by adjusting the braces 5 and turning the standards 1 with relation to the cultivator beams the plates 2 may be disposed in desired planes with relation to the row of plants. Furthermore the blades 6 may be adjusted upon the plates 2 whereby they will operate at a greater or less depth in the soil and at the opposite sides of the row of plants.

From the foregoing description taken in conjunction with the accompanying drawings, it will be observed that a cultivator fender of simple and durable structure is provided and that the parts thereof are susceptible of numerous adjustments to cause them to operate properly at the opposite sides of a row of plants and in the soil and to accommodate themselves to the conditions existing about the plants and soil.

Having described the invention what is claimed is:—

A cultivator fender comprising a standard, a plate attached to the standard, a blade pivotally connected with the plate, means for securing the blade at an adjusted position upon the plate, the said blade having an outwardly and rearwardly extending portion which is twisted transversely, whereby the forward edge of the blade is held in a horizontal line and the rear edge of the blade held at an acute angle to a horizontal line.

In testimony whereof I affix my signature.

WILLIAM M. PEEL.